United States Patent [19]

Shibahata et al.

[11] Patent Number: 4,586,581
[45] Date of Patent: May 6, 1986

[54] VEHICLE CONTROL SYSTEM

[75] Inventors: Yasuji Shibahata, Yokohama; Yasumasa Tsubota, Yokosuka; Takaaki Uno, Zama, all of Japan

[73] Assignee: Nissan Motor Co., Ltd., Japan

[21] Appl. No.: 658,604

[22] Filed: Oct. 9, 1984

[30] Foreign Application Priority Data

Oct. 15, 1983 [JP] Japan ................... 58-191701
Oct. 15, 1983 [JP] Japan ................... 58-193015
Oct. 15, 1983 [JP] Japan ................... 58-193017

[51] Int. Cl.⁴ ............................................. B62D 5/06
[52] U.S. Cl. .................................... 180/140; 180/141; 180/143
[58] Field of Search ................... 180/140, 141, 143

[56] References Cited

U.S. PATENT DOCUMENTS

| | | | |
|---|---|---|---|
| 3,305,041 | 2/1967 | Schramm | 180/140 |
| 3,572,460 | 3/1971 | Berlich | 180/140 |
| 3,814,203 | 6/1974 | Gieszl | 180/140 |
| 4,440,254 | 4/1984 | Shibahata et al. | 180/140 |
| 4,441,572 | 4/1984 | Ito et al. | 180/143 |

FOREIGN PATENT DOCUMENTS 54-159921 12/1979 Japan .
57-99470 6/1982 Japan .

Primary Examiner—Joseph F. Peters, Jr.
Assistant Examiner—Donn McGiehan
Attorney, Agent, or Firm—Leydig, Voit & Mayer, Ltd.

[57] ABSTRACT

A vehicle is equipped with a power steering system having a power cylinder, and a vehicle control mechanism having an actuator. The power cylinder and the actuator are supplied with hydraulic fluid under pressure through first and second control valves, respectively, to independently control the power steering control system and the vehicle control mechanism. The first and second control valves are configurated integrally with each other to form a single control valve assembly, thereby providing advantages of weight, production cost, and required space reductions.

24 Claims, 19 Drawing Figures

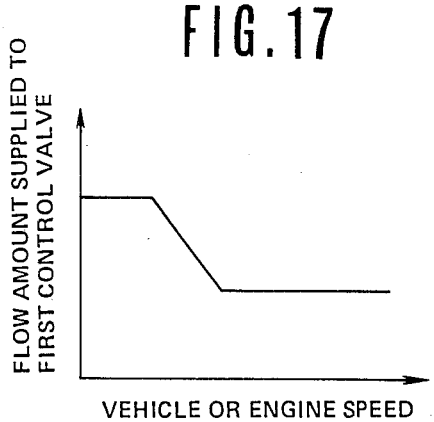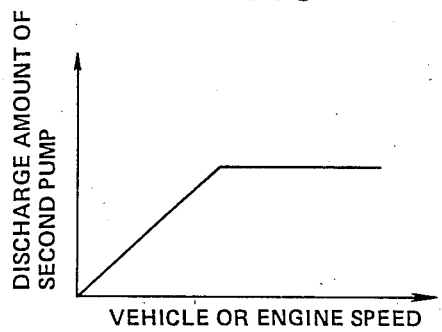

VEHICLE CONTROL SYSTEM

BACKGROUND OF THE INVENTION

1. Field of the Invention

This invention relates in general to an improvement in a vehicle control system and more specifically to an improvement in a vehicle control system comprising a power steering system for assisting in turning steerable wheels under the action of hydraulic fluid and a vehicle control mechanism for controlling a vehicle operation in response to a steering effort.

2. Description of Prior Art

In order to improve cornering performance in modern automotive vehicles, a steering system including a rear wheel control system has been proposed, which rear wheel control system is disclosed as a compliance steer control system, for example, in U.S. Pat. No. 4,440,254 issued on Apr. 3, 1984 to Shibahata et al.

This compliance steer control system is used in cooperation with a power steering system and includes hydraulic actuators associated with elastomeric insulators interposed between a rear suspension arrangement and a vehicle body. The hydraulic actuators are supplied with hydraulic pressure to be fed to a power cylinder of the power steering system, thus achieving a control to increase or decrease so-called compliance steer of the rear wheels during cornering of the vehicle. This control system arrangement is intended mainly to improve vehicle cornering performance at high vehicle speeds by turning the rear wheels in the same direction as the front wheels upon turning a steering wheel to set vehicle cornering characteristics on the understeer side.

Now, as is well known, in order to provide an appropriate steering feeling to a driver, the conventional power steering system is arranged such that steering assist power developed by the power cylinder is minimized at high vehicle speeds and no steering assist power is developed when the driver's steering effort applied to the steering wheel is very slight. This arrangement provides a so-called non-sensitive region in which no steering assist power is developed. Accordingly, the power cylinder of the power steering system is supplied with low hydraulic pressure at high vehicle speeds and is supplied with no hydraulic pressure when a very slight turning effort is applied to the steering wheel.

However, in the compliance steer control of rear wheels, it is desirable to make a greater compliance steer to turn the rear wheels large amounts during high speed cornering for the purpose of attaining more stable cornering. Additionally, it is also desirable to turn the rear wheels even upon a slight turning angle of the front wheels, i.e., a slight steering effort being applied to the steering wheel when the steering wheel is rotated. In this regard, it has been extremely difficult to control the conventional compliance steering so as to obtain optimum characteristics for cornering performance, by using compliance steer control systems of the above-mentioned type wherein the hydraulic actuators thereof are supplied with the hydraulic pressure fed to the power cylinder of the power steering system. As a result, it becomes necessary to control the hydraulic pressure supplied to the compliance steer control system independently from the hydraulic pressure supplied to the power cylinder of the power steering system. This will be the same in case of controlling body roll of vehicles.

SUMMARY OF THE INVENTION

A vehicle control system of the present invention is composed of a power steering system including a steering gear through which steering effort applied to a steering wheel is transmitted to steerable front wheels, and a power cylinder associated with the steering gear to power-assist turning operation of the front wheels under the action of hydraulic fluid under pressure. The vehicle control system is further composed of a vehicle control mechanism for controlling a vehicle operation, the vehicle control mechanism including an actuator operated under the action of hydraulic fluid under pressure. Additionally, a control valve assembly is provided including first and second control valves through which hydraulic fluid from a hydraulic pump is controllably supplied to the power cylinder of the power steering system and the actuator of the vehicle control mechanism, respectively. The first and second control valves are different in flow control characteristics and have first and second valve elements, respectively, drivingly connected with each other and operable in synchronism with each other in response to the steering effort.

Thus, by virtue of the first and second control valves, the power steering system and the vehicle control mechanism can be independently controlled from each other, thereby achieving an appropriate vehicle operation control. Additionally, the first and second control valves are formed integral with each other as a single control valve assembly, which is advantageous from view points of weight, production cost, and space reductions for the vehicle control system.

BRIEF DESCRIPTION OF THE DRAWINGS

The features and advantages of the vehicle control system according to the present invention will be more clearly appreciated from the following description taken in conjunction with the accompanying drawings in which like reference numerals designate corresponding parts and elements, in which:

FIG. 17 is a graph showing the flow amount characteristics of hydraulic fluid to be supplied to the first (pressure) control valve of the steering system by a first pump of the pump assembly of FIG. 16, in terms of vehicle or engine speed; and FIG. 18 is a graph showing the discharge amount characteristics of a second pump of the pump assembly of FIG. 16, in terms of vehicle or engine speed.

DETAILED DESCRIPTION OF THE INVENTION

Figure 1:
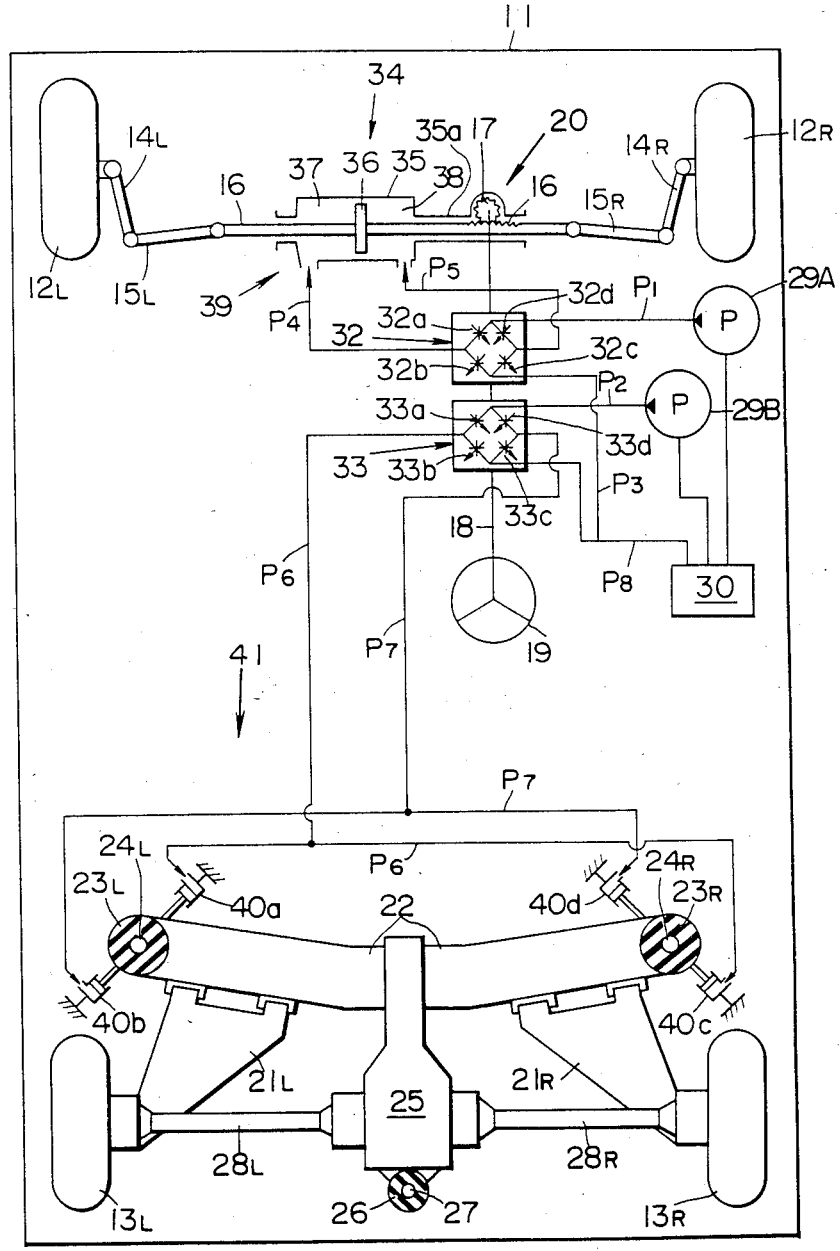
FIG. 1 is a schematic plan view of a first embodiment of a vehicle control system in accordance with the present invention.

Referring now to FIG. 1, a first embodiment of a steering system according to the present invention is illustrated. In this embodiment, the steering system is shown to be incorporated with, for example, an automotive vehicle whose body is designated by the reference numeral 11. The steering system comprises steerable front wheels 12R, 12L and rear wheels 13R, 13L which are all rotatably mounted to the vehicle body 11. The front wheels 12R, 12L are respectively connected with the opposite ends of a tie rod or rack (rack gear) 16 through knuckle arms 14R, 14L and side rods 15R, 15L. The rack 16 meshes with a pinion 17 which is connected through a steering shaft 18 to a steering wheel 19. These rack 16 and pinion 17 constitute a steering gear 20 as usual.

The rear wheels 13R, 13L are pivotally supported to a rear suspension member 22 through semi-trailing arms 21L, 21R, respectively. The rear suspension member 22 is elastically supported at its opposite ends on the vehicle body 11 through elastomeric insulators 23R, 23L. As shown, each of pins 24L, 24R secured to the vehicle body 11 is disposed at the central part of the elastomeric insulator 23R, 23L in such a manner that the rear suspension member 22 is insulated from each pin 24L, 24R. A differential gear housing 25 is secured to the rear suspension member 22 by means of bolts (not shown). This differential gear housing 25 is also elastically supported to the vehicle body 11 through an elastomeric insulator 26. A pin 27 secured to the vehicle body 11 is disposed at the central part of the elastomeric insulator 26 so that the differential gear housing is insulated from the pin 27. The differential gear (not shown) in the housing 25 is connected through drive shafts 28R, 28L with the rear wheels 13R, 13L, respectively.

First and second hydraulic pumps 29A, 29B are provided to pressurize hydraulic fluid from a reservoir 30 and discharge the pressurized fluid therefrom, thus constituting first and second hydraulic fluid providing means. The first pump 29A is fluidly connected with an inlet port (not identified) of a first control valve 32 via a line $P_1$. The second pump 29B is fluidly connected with an inlet port (not identified) of a second control valve 33 via a line $P_2$.

The first control valve 32 has a return port (not identified) which is fluidly communicated through a line $P_3$ with the reservoir 30, and two outlet ports (not identified) which are fluidly communicated through lines $P_4$, $P_5$ with a power cylinder 34 associated with the rack 16. The first control valve 32 is arranged to control the hydraulic fluid supplied from the first pump 29A in response to the rotation of the steering wheel 19 (or the steering effort applied to the steering wheel 19 in this embodiment) and then to supply the thus controlled hydraulic fluid into the power cylinder 34. More specifically, the first control valve 32 has four variable orifices 32a, 32b, 32c, and 32d whose flow passage area changes in response to the steering effort (torque) applied to the steering wheel 19, thereby functioning to control the hydraulic fluid under the action of the variable orifices. The power cylinder 34 includes a cylinder body 35 disposed in the vehicle body 11. A piston 36 fixed to the rack 16 is slidably movably disposed in the cylinder body 35 in a manner to define two fluid chambers 37, 38 inside the cylinder body 35. The power cylinder 34 is arranged to develop a steering assist power in response to the pressure differential between the fluid chambers 37, 38, so as to drive the rack 16. The pump 29, reservoir 30, first control valve 32, and power cylinder 34 constitute a power steering system 39 which is known per se.

The second control valve 33 has two outlet ports (not identified) which are respectively fluidly communicated through lines $P_6$, $P_7$ with a first group of actuators 40a, 40c, and a second group of actuators 40b, 40d. Each actuator 40a–40d is of a hydraulic cylinder type having a cylinder and a piston slidably disposed in the cylinder, and is mechanically interposed between the rear suspension member 22 and the vehicle body 11. The second control valve 33 further has a return port (not identified) which is communicated through a line $P_8$ with the reservoir 38. The second control valve 33 has four variable orifices 33a, 33b, 33c, and 33d whose flow passage area changes in response to the steering effort applied to the steering wheel 19, thereby controlling the hydraulic fluid supplied from the flow dividing valve 31 in response to the steering effort thus to supply the controlled hydraulic fluid to the respective actuators 40a, 40b, 40c, 40d. Each of the acutators 40a, 40b, 40c, 40d is connected with the vehicle body 11 and the rear suspension member 22 by means of pin joints, and functions to distort the elastomeric insulator 23R, 23L under the action of the hydraulic fluid supplied from the second control valve 33, thereby causing the rear suspension member 22 to rotatably move around the pin 27. In other words, the actuators 40a, 40b, 40c, 40d function to turn the rear wheels 13R, 13L by rotatably moving the rear suspension member 22. The pump 29, reservoir 30, second control valve 33 and actuators 40a, 40b, 40c, 40d constitute a compliance steer control system or rear wheel control mechanism 41. This compliance steer control system is disclosed in U.S. Pat. No. 4,440,254 and therefore the detailed explanation thereof is omitted for the purpose of simplicity of illustration.

Figure 2:
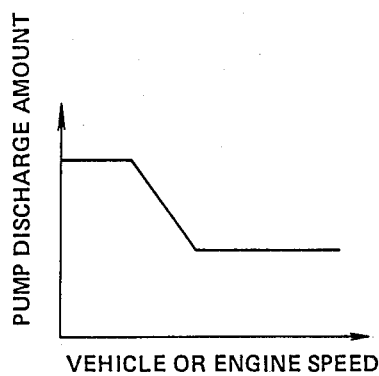
FIG. 2 is a graph showing the discharge amount characteristics of a first hydraulic pump used in the steering system of FIG. 1, in terms of vehicle or engine speed.
Figure 3:
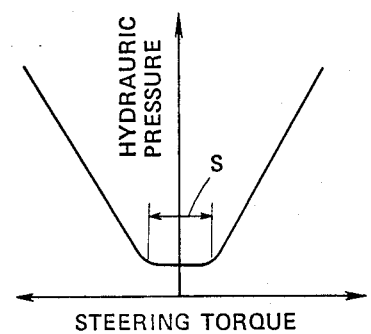
FIG. 3 is a graph showing the hydraulic pressure characteristics of a first (pressure) control valve used in the steering system of FIG. 1, in terms of steering effort or torque.

In this embodiment, the first pump 29A is adapted to have a characteristics as shown in FIG. 2 in which the discharge amount thereof decreases at high vehicle or engine speeds, and additionally the first control valve 32 for the power steering system 39 is adapted to have a non-sensitive region S in which no steering assist power is developed when the steering effort (or torque) applied to the steering wheel 19 is very slight, as shown in FIG. 3. The non-sensitive region S is set within a narrow steering angle including a zero steering angle for straight-ahead cruising of the vehicle, i.e., a narrow steering wheel rotation angle including a straight-ahead position of the steering wheel 19.

Figure 4:
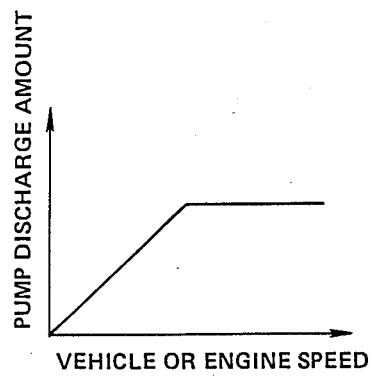
FIG. 4 is a graph showing the discharge amount characteristics of a second hydraulic pump used in the steering system of FIG. 1, in terms of vehicle or engine speed.
Figure 5:
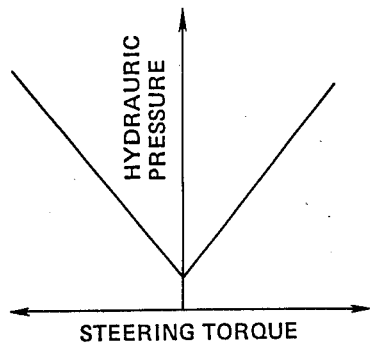
FIG. 5 is a graph showing the hydraulic pressure characteristics of a second (pressure) control valve used in the steering system of FIG. 1, in terms of steering effort or torque.

The second pump 29B for the compliance steer control system 41 is adapted to have a characteristics as shown in FIG. 4 in which the discharge amount thereof increases at high vehicle or engine speeds, and additionally the second control valve 33 is adapted to have no non-sensitive region as shown in FIG. 5 in contrast with the first control valve 32.

Figure 6:
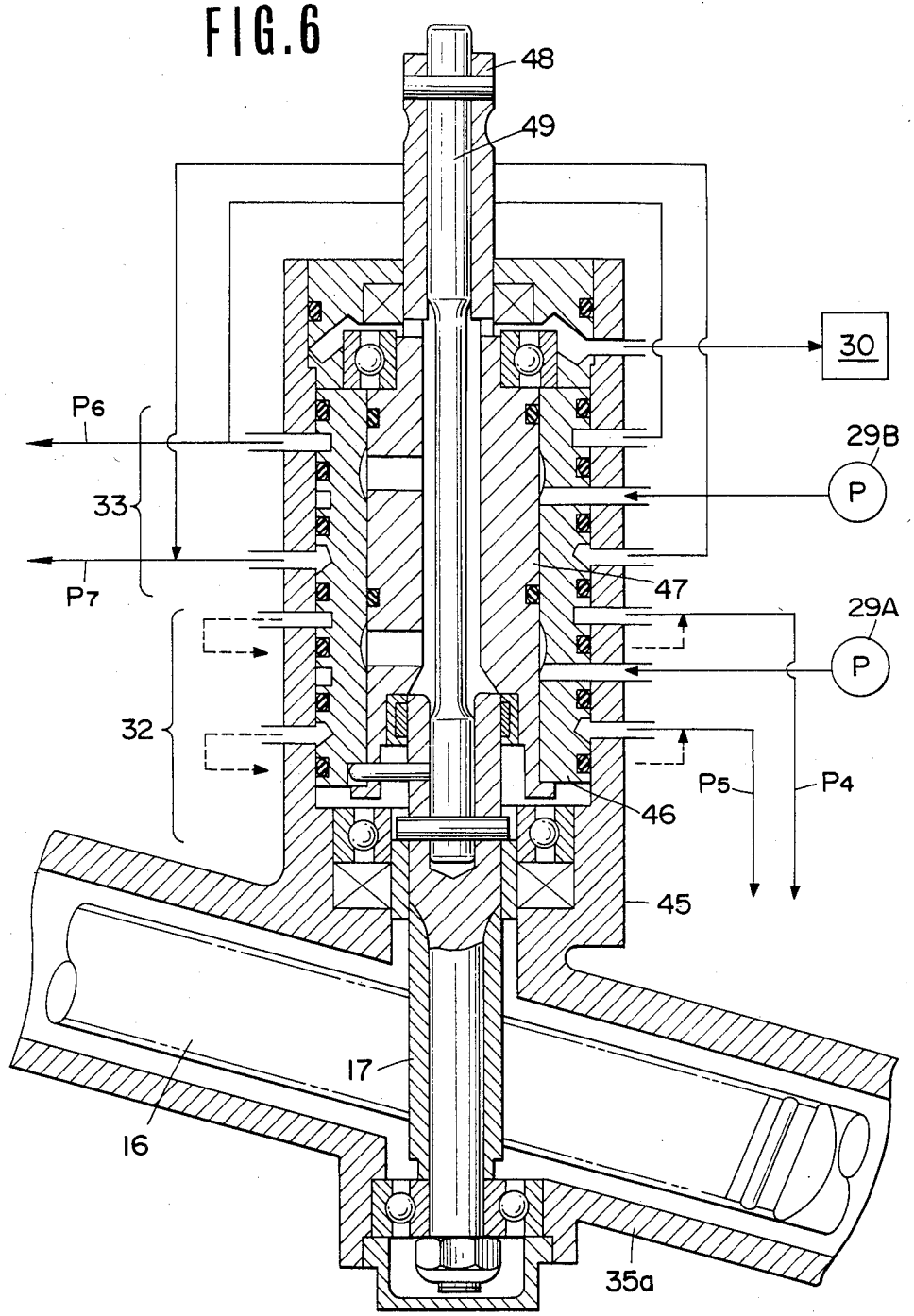
FIG. 6 is a longitudinal sectional view of a control valve assembly including the first and second control valves, used in the steering system of FIG. 1.
Figure 7:
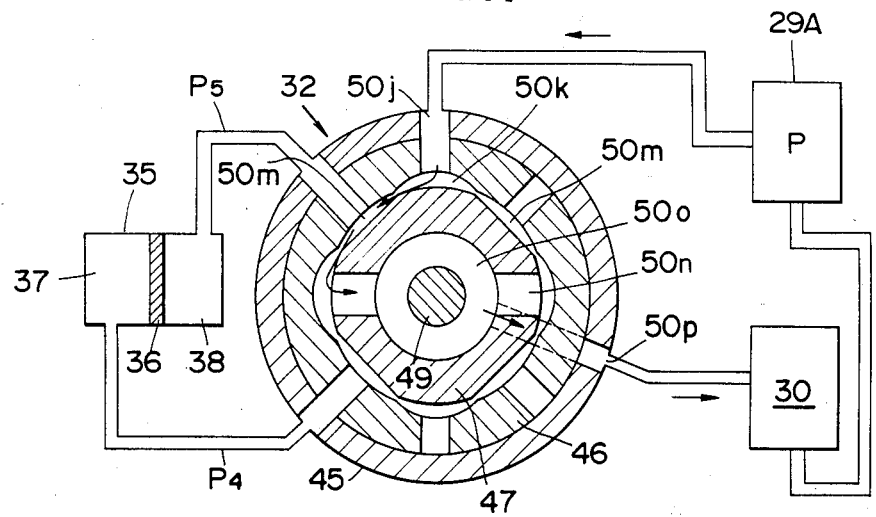
FIGS. 7 and 8 are transverse sectional views of a control valve assembly of FIG. 6, illustrating the operation thereof.
Figure 8:
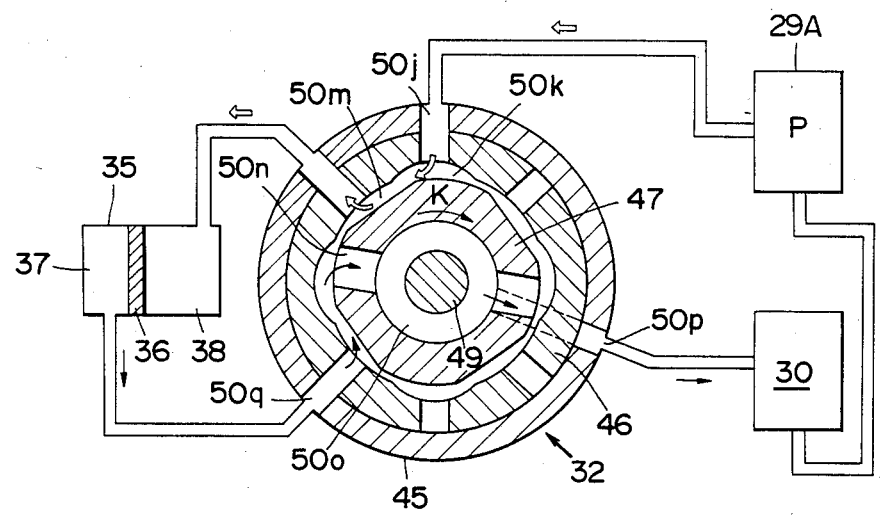

FIGS. 6 to 8 show an example of a control valve assembly (no numeral) in which the first and second control valves 32, 33 are incorporated or formed integral with each other. The control valve assembly includes a valve housing 45 which is formed integrally with a steering gear housing 35a integrally formed with the cylinder body 35 of the power cylinder 34. The rack gear 16 is disposed in the steering gear housing 35a and is in mesh with the pinion gear 17.

Rotatably and fittingly disposed within the valve housing 45 is a hollow cylindrical valve body 46 which is connected to the pinion gear 17 in a manner to rotate together with the pinion gear 17. A rotatable valve member 47 is rotatably and fittingly disposed within the valve body 46 and rotatable together with a valve shaft 48 which is rotated together with the steering wheel 19. The valve shaft 48 is connected with the pinion gear 17 through a torsion bar 49 extending through a central axial opening (not identified) of the valve member 47, so that the rotation of the valve shaft 48 is transmitted through the torsion bar 49 to the pinion gear 17.

Accordingly, when a steering effort or torque is applied to the valve shaft 48 upon the rotation of the steering wheel 19, the torsion bar 49 is distorted due to the resistance between the front wheels 12L, 12R and road, so that a rotational displacement corresponding to the torsion bar distortion is caused between the valve member 47 moved with the valve shaft 48 and the valve 46. While the transverse sectional view of only the first control valve 32 for the power steering system 39 is shown in FIGS. 7 and 8, it will be understood that the second control valve 33 for the compliance steer control system 41 also has a similar transverse sectional view of configuration.

Under the rotational displacement made as mentioned above between the valve body 46 and the valve member 47, the pressure and flow direction of hydraulic fluid supplied from pump 29A are controlled, and then the thus controlled hydraulic fluid is fed to the fluid chamber 37 or the fluid chamber 38 of the power cylinder 34 to produce a steering assist power, thereby turning the front wheels 12L, 12R by a required amount through the rack and pinion 16, 17. More specifically, the movement of the valve shaft 48 varies depending on the load applied to front wheels 12L, 12R, in which hydraulic pressure supplied to the power cylinder 34 is controlled depnding on the load to the front wheels. Simultaneously, a force corresponding to the distorsion angle of the torsion bar 49 is transmitted as a reaction force to a driver. As a result, the driver always can feel a road reaction force depending on the load applied to the front wheels 12L, 12R.

When the vehicle cruises straight ahead, the first control valve 32 is put in a state shown in FIG. 7. In this state, the hydraulic fluid from the first pump 29A flows through the inlet port 50j into a groove 50k formed on the inner peripheral surface of the valve body 46. In the case of FIG. 7 in which the peripherally opposite clearances or orifices formed between the surface of the groove 50k make the same flow passage areas to provide the same flow resistance, the hydraulic fluid flows to the return port 50n via the grooves 50k and grooves 50m formed on the outer peripheral surface of the valve member 47, and thereafter flows through a clearance 50o between the valve member 47 and the torsion bar 49 to an outlet port 50p formed in the valve housing 45, thus returning the hydraulic fluid to the reservoir 30. Consequently, in this case, a pressure difference is not made between the fluid chambers 37 and 38, so that the piston 36 is kept in its neutral position without movement.

When the steering wheel 19 turns to the right, the first control valve 32 is put in a state as shown in FIG. 8. In this state, the valve member 47 has been rotated in the direction of an arrow K from the state of FIG. 7, the grooves 50k and 50m are allowed to widely communicate with each other, so that a fluid pressure from the inlet port 50j is applied to the fluid chamber 38 of the power cylinder 34 to push the piston 36, thus moving the rack gear 16 leftward in FIG. 1. At this time, the fluid forced out from the fluid chamber 37 enters the clearance 50o through a port 50q and then returns from the outlet port 50p to the reservoir 30.

The manner of operation of the thus arranged vehicle control system will be discussed hereinafter.

This vehicle control system is arranged to turn the front wheels 12R, 12L and the rear wheels 13R, 13L relative to a vertical plane (not shown) containing an axis of the vehicle body extending in the vehicle straight ahead direction, in response to the rotation of the steering wheel 19. In this vehicle control system, the power steering system 39 develops a steering assist power to assist the steering effort for turning the front wheels 12R, 12L, while the compliance steer control system 41 turns the rear wheels 13R, 13L in the same direction as the front wheels 12R, 12L.

When the vehicle cruises straight ahead in which the steering wheel 19 is in the neutral position, the piston 36 of the power cylinder 34 is in its neutral position, thereby maintaining straight-ahead cruising of the vehicle.

By setting the characteristics of the first pump 29A, the second pump 29B, the first control valve 32, and the second control valve 33 as in FIGS. 2, 4, 3, and 5, respectively, the discharge amount of the first pump 29A becomes larger at low vehicle speeds, thereby increasing the steering assist power of the power steering system 39. Accordingly, vehicle operation at low speeds such as in putting the vehicle into a garage is facilitated. In this case, vehicle speed is lower so that side force acting on the vehicle during cornering is scracely developed, the diacharge amount of the pump 29B is nealy zero, thereby making nearly no compliance steer control.

At a high vehicle speed, the discharge amount of the pump 29A becomes smaller, the steering assist power of the power steering system 39 becomes smaller. Accordingly, the steering wheel 19 is prevented from wagging or shaking during high speed cruising. Additionally, since the non-sensitive resion S is set in the first control valve 32 as shown in FIG. 3, the steering assist power is not developed upon a slight angle displacement of the steering wheel 19, thereby obtaining straight-ahead cruising stability of the vehicle.

When the steering wheel 19 is turned at a high vehicle speed in which the side force becomes greater, the discharge amount of the pump 29B becomes larger as shown in FIG. 4, the compliance steer of the rear wheels 13L, 13R increases, thus improving vehicle cruising stability during cornering at high speeds. Additionally, since the non-sensitive region S is not set in the second control valve 33 as shown in FIG. 4, immediate response to steering wheel operation can be made in the compliance steer control system 41. Consequently, compliance steer control can be effectively accomplished even upon a slight displacement angle of the steering wheel 19.

While the control valve assembly of this embodiment has been shown and described as of a rotary valve type, it will be understood that it may be of a spool valve type, a planet gear type, or a conical rotary valve type. In addition, although the above-discussed embodiment has been shown and described as being provided with the compliance steer control system, it will be appreciated that the compliance steering control system may be replaced with other vehicle control mechanisms such as a device for controlling body roll of vehicles.

Figure 9:
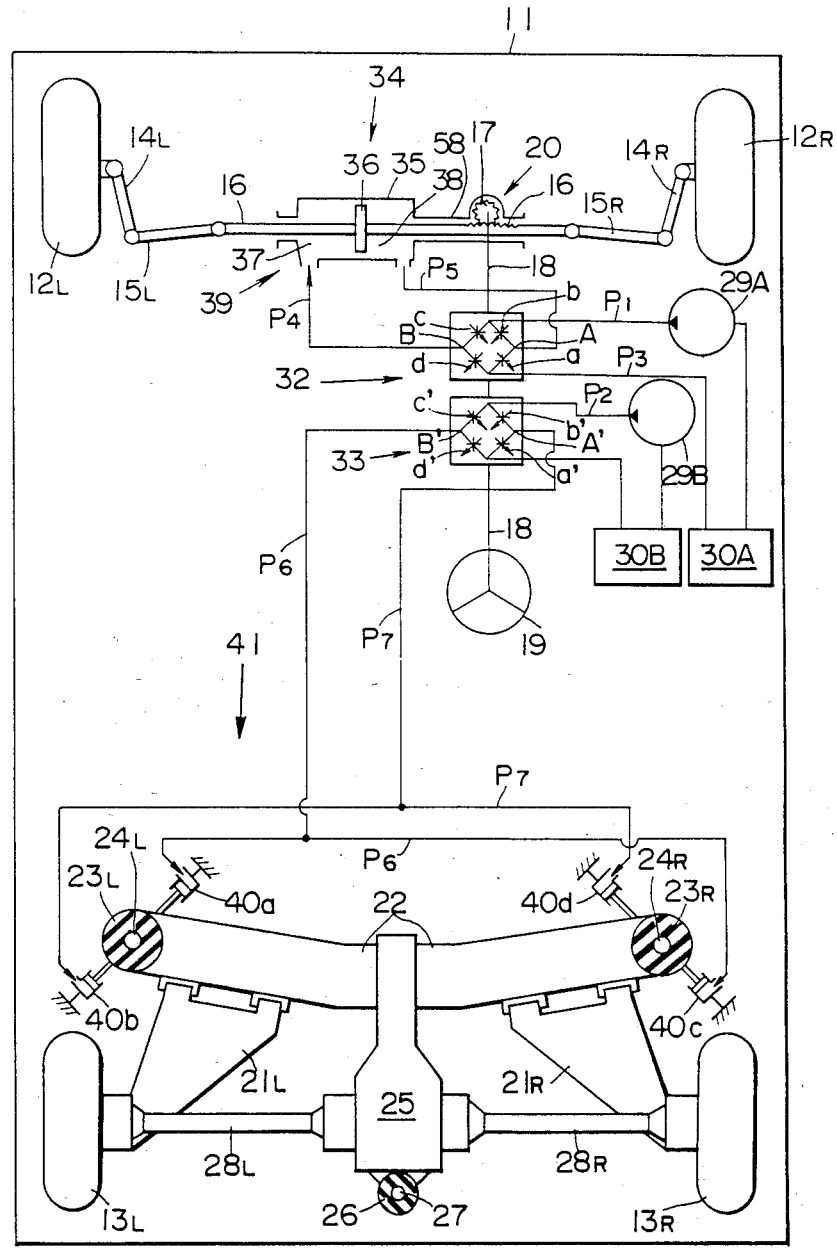
FIG. 9 is a schematic plan view of a second embodiment of the vehicle control system according to the present invention.
Figure 10:
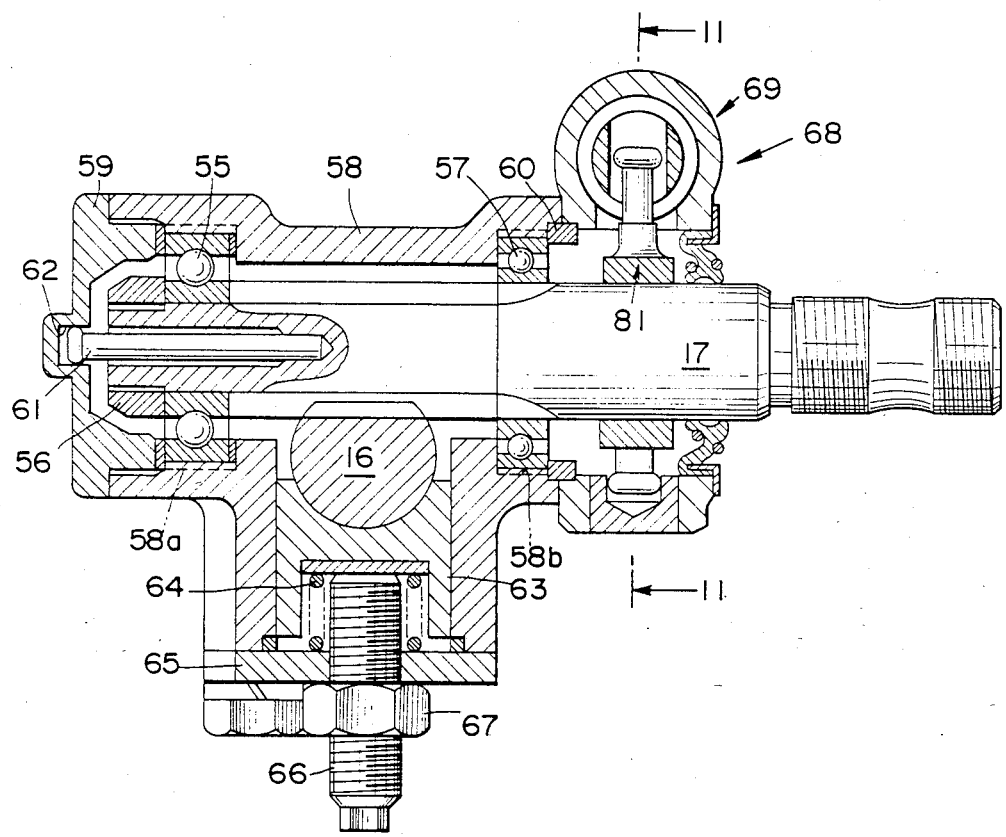
FIG. 10 is the vertical sectional view of the control valve assembly used in the vehicle control system of FIG. 9.

FIGS. 9 and 10 illustrate a second embodiment of the vehicle control system according to the present invention, which is similar to the first embodiment except mainly for the configuration of the control valve assembly including the first and second control valves 32, 33.

In this embodiment, the pinion gear 17 is provided at its front end section with a first ball bearing 55 in a manner that the inner race of the bearing 55 fits on the pinion gear front end section and secured in position by means of a nut 56. A second ball bearing 57 is fittingly mounted on a portion of the pinion gear 17 which portion is located rearward or on the opposite side of the first ball bearing 55 relative to the rack 16. The outer race of the first and second ball bearings 55, 57 are respectively fittingly disposed in elognate cut-out portion or grooves 58a, 58b formed in a gear housing 58. Each elongate cut-out portion 58a, 58b is elliptical in cross-section and so located that its longitudinal axis is parallel with the axis of the rack 16 which is movable in the direction of the width of the vehicle body 11. The first and second ball bearings 55, 57 are secured in position by means of a plug 59 and a stop ring 60, respectively, in such a manner as to be slightly movable in the direction of the width of the vehicle body 11. This leads to the fact that the pinion gear 17 is supported slightly movably in the direction of the vehicle body width. A reaction spring 61 is securely inserted into the front end section of the pinion gear 17, and its free end is pivotally disposed in a support hole 62 formed in the plug 59. The rack 16 is supported at its bottom surface by a rack support 63. A spring 64 is interposed between the rack support 63 and a cover plate 65 covering a bottom opening of the gear housing 58. This spring 64 urges the rack 16 against the pinion gear 17 through the rack support 63, thereby omitting backlash between the rack 16 and the pinion gear 17. A stopper bolt 66 screwed in the cover plate 65 is fixed to the cover plate 65 by means of a lock nut 67.

A spool housing 69 of a control valve assembly 68 is secured to the rear end portion of the gear housing 58. The rear end portion of the pinion gear 17 projected rearward the spool housing 69 is connected to the steering wheel 19 through the steering shaft 18 provided at its intermediate section with a ball joint (not shown). The spool housing 69 is formed hollow to have a piercing opening 70 which extends in the direction of the width of the vehicle body 11. An elongate valve spool 71 is slidably disposed in the piercing opening 70. The opposite open ends of the spool housing 69 are respectively closed by an adjustment screw 72 and a bolt 74. The adjustment screw 72 is fixed to the spool housing 69 by means of a lock nut 73. A centering spring 75 is interposed between the valve spool 71 and the adjustment screw 72 while a centering spring 76 is interposed between the valve spool 71 and the bolt 74, thereby biasing the valve spool 71 to its neutral position. The valve spool 71 includes a first valve spool section 77, and a second valve spool section 78 which is aligned and integral with the first valve spool section 77. In this connection, the spool housing 69 includes a first housing section 79 for housing the first valve spool section 77, and a second housing section 80 for housing the second valve spool section 78 which second housing section is aligned and integral with the first housing section 79.

The first housing section 79 is formed with ports A, B, P, $T_1$ and $T_2$. Additionally, variable orifices a, b, c, and d are formed between the first housing section 79 and the first valve spool section 77, in which the flow passage area of each variable orifice varies in response to the axial displacement of the first valve spool section 77. The ports P and A are communicable with each other through the variable orifice b. The ports P and B are communicable with each other through the variable orifice c. The ports $T_1$ and A are communicable with each other through the variable orifice a. The ports $T_2$ and B are communicable with each other through the variable orifice d. The second housing section 80 is formed with ports A', B', P', $T_1'$ and $T_2'$. Additionally, variable orifices a', b', c' and d' are formed between the second housing 80 and the second valve spool section 78 in which the flow passage area of each variable orifice varies in response to the axial displacement of the second valve spool section 78. The ports P' and A' are communicable with each other through the variable orifice b'. The ports P' and B' are communicable with each other through the variable orifice c'. The ports $T_1'$ and A' are communicable with each other through the variable orifice a'. The ports $T_2'$ and B' are communicable with each other through the variable orifice d'. The ports B and A are fluidly respectively communicated with the fluid chambers 37 and 38 of the power cylinder. The ports B' and A' are fluidly communicated with the actuators or hydraulic cylinders 40a, 40c, and the actuators or cylinders 40d, 40b, respectively. The first valve spool section 77 and the first housing section 79 constitute the first control valve 32 which is fluidly connected with the power cylinder 34 of the power steering system 39. The second valve spool section 78 and the second housing section 80 constitute the second control valve 33 which is fluidly connected with the hydraulic cylinders 40a, 40b, 40c and 40d. It is to be noted that the first control valve 32 is adapted to have the non-sensitive region S as shown in FIG. 3 in which region S no steering assist power is developed within a slight steering effort or torque range, while the second control valve 33 is adapted to have no non-sensitive region as shown in FIG. 5.

In this embodiment, the suction port of the first pump 29A is fluidly connected with a first reservoir 30A, and the discharge port thereof is fluidly connected with the port P of the first housing section 79. The above-mentioned ports $T_1$ and $T_2$ are fluidly connected with the first reservoir 30A. The first pump 29A is adapted to have the characteristics as shown in FIG. 2 in which the discharge amount of the pump increases at a low vehicle or engine speeds while it decreases at high vehicle or engine speeds. The suction port of the second pump 29B is fluidly connected with a second reservoir 30B, and the discharge port thereof is fluidly connected to the port P' of the second housing section 80. The above-mentioned ports $T_1'$ and $T_2'$ are fluidly connected with the second reservoir 30B. The second pump 29B is adapted to have the characteristics as shown in FIG. 4 in which the discharge amount of the pump is small at low or engine speeds while it becomes greater at high vehicle or engine speeds. The first and second pumps 29A, 29B constitute means providing hydraulic fluid under pressure.

Figure 11:
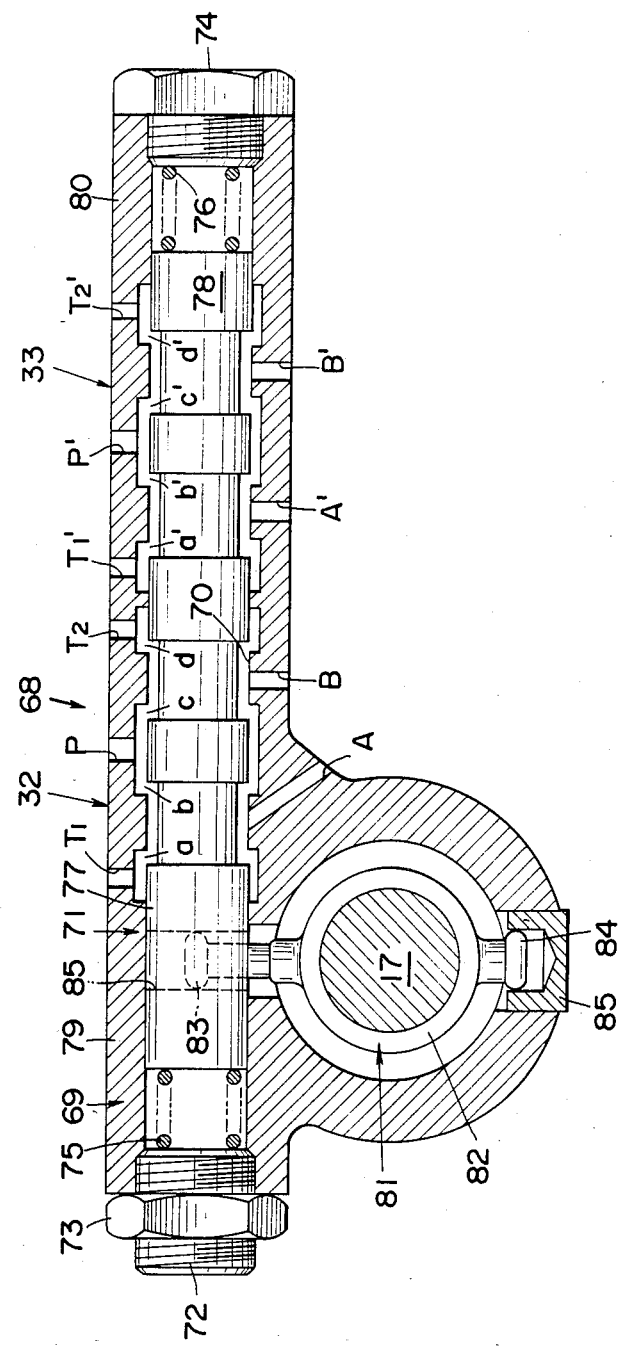
FIG. 11 is a sectional view taken in the direction of arrows substantially along the line 11—11 of FIG. 10.

In operation of the second embodiment vehicle control system of FIGS. 9 to 11, when the vehicle cruises straight ahead, the pinion gear 17 is in its neutral position and consequently the valve spool 71 is in its neutral position in the width direction of the vehicle body 11. As stated above, the first control valve 32 is adapted to have the non-sensitive region S and therefore the flow passage areas of the respective variable orifices a, b, c and d are equal to each other when the valve spool 71 is in the neutral position. Accordingly, hydraulic fluid from the first pump 29A flows from the port P into the first control valve 32, and thereafter discharged through the ports $T_1$, $T_2$ to the first reservoir 30A without being supplied to the power cylinder 34. Since the second control valve 33 is adapted to have no non-sensitive resion, the variable orifices a', b', c' and d' are closed when the valve spool 71 is in the neutral position. Accordingly, hydraulic fluid from the second pump 29B is blocked by the variable orifices b' and c'.

When the steering wheel 19 is rotated to turn the vehicle during cornering, the rack 16 is driven by the pinion gear 17. At this time, the pinion gear 17 receives a reaction force in the direction of the width of the vehicle body 11 and consequently is slightly displaced in the vehicle body width direction. Accordingly, the drive lever 81 pivotally moves upon pivotal support of the support pin section 84, so that the valve spool 71 is driven or moved in the direction of the width of the vehicle body 11 compressing either one of the centering springs 75, 76. In this state, hydraulic fluid from the first pump 29A is not supplied to the power cylinder 34 when the first valve spool section 7 is located in a position within the non-sensitive region S, while it is supplied to either one of the fluid chambers 37, 38 of the power cylinder 34 when the first valve spool section 77 is located in a position out of the non-sensitive region S. As a result, when the first valve spool section 77 is located in the position within the non-sensitive region S, the power cylinder 34 does not develop the steering assist power for turning the front wheels 12L, 12R in the direction corresponding to the rotation of the steering wheel 19 so that the steering effort to be applied to the steering wheel 19 cannot be reduced. In contrast with this, when the first valve spool section 77 is located in the position out of the non-sensitive region S, the power cylinder 34 develops the steering assist power to reduce the steering effort to be applied to the steering wheel 19, thereby providing an appropriate steering feeling to the driver.

The rear wheel control mechanism 41 is so operated along with the displacement of the second valve spool section 78, that the rear suspension member 22 is turned around the pin 27 deforming the elastometric insulators 23L, 23R, 27, thus turning the rear wheels 13L, 13R in the direction of the steering effort applied to the steering wheel 19. This sensitively reduces toe-out phenomena of the rear wheels 13L, 13R caused by side force applied to the rear wheels during cornering of the vehicle, simultaneously with the rotation of the steering wheel 19. As a result stability of the vehicle during the cornering is obtained particularly at high speeds. This means that the first and second valve spool sections 77, 78 are driven in the direction of the vehicle body width in response to the rotation of the steering wheel 19 thereby to control the hydraulic fluid supplied to the hydraulic cylinders 40a, 40b, 40c, 40d.

When cornering is made at lower speeds, the discharge amount of the first pump 29A is larger and the above-mentioned reaction force applied to the pinion gear 17 is larger, so that the flow passage area of the variable orifice b or c becomes larger thereby to raise the pressure of the fluid supplied to the power cylinder 34. Consequently, the power cylinder 34 develops a greater steering assisted power, thus sharply reducing the steering effort applied to the steering wheel 19. At this time, the discharge amount of the second pump 29B is smaller and therefore a merely slight actuation is made on the hydraulic cylinders 40a, 40c, or the hydraulic cylinders 40b, 40d, so that a merely slight turning is made on the rear wheels 13L, 13R. This appropriately reduces the toe-out phenomena caused by a smaller side force applied to the rear wheels 13L, 13R.

When cornering is made at high speeds, the discharge amount of the first pump 29A is smaller and the above-mentioned reaction force applied to the pinion gear 17 is smaller, so that flow passage area of the variable orifices b or c becomes smaller thereby to lower the pressure of the fluid supplied to the power cylinder 34. Accordingly, the steering assist power is decreased and therefore the steering effort to be applied to the steering wheel 19 is merely slightly reduced. At this time, since the discharge amount of the second pump 29B is larger, the hydraulic cylinders 40a, 40c, or the hydraulic cylinders 40b, 40d are largely actuated thereby increasing the turning angle of the rear wheels 13L, 13R. This appropriately reduces toe-out phenomena of the rear wheels 13L, 13R caused by a greater side force applied to the rear wheels, thus obtaining an appropriate steering feeling while attaining vehicle cruising stability during cornering at high speeds.

As discussed above, pressurized hydraulic fluid from the first pump 29A is controlled by the first control valve 32 to be supplied to the power cylinder 34, while pressurized hydraulic fluid from the second pump 33 is controlled by the second control valve 33 to be supplied to the hydraulic cylinders 40a, 40b, 40c, 40d, thereby enabling to separately and independently control the hydraulic circuits of the power steering system 39 and the rear wheel control mechanism 41. Furthermore, since the valve spool 71 is shaped to extend in the direction of the width of the vehicle body 11, the control valve assembly 68 including the first and second control valves 32, 33 can be so disposed that its longitudinal axis extends in the vehicle body width direction in which there is a relatively surplus space. Accordingly, the steering shaft 18 can be disposed in such a state as to enable to set a bending angle obtainable by using a ball joint disposed at the intermediate section of the steering shaft 18.

Figure 12A:
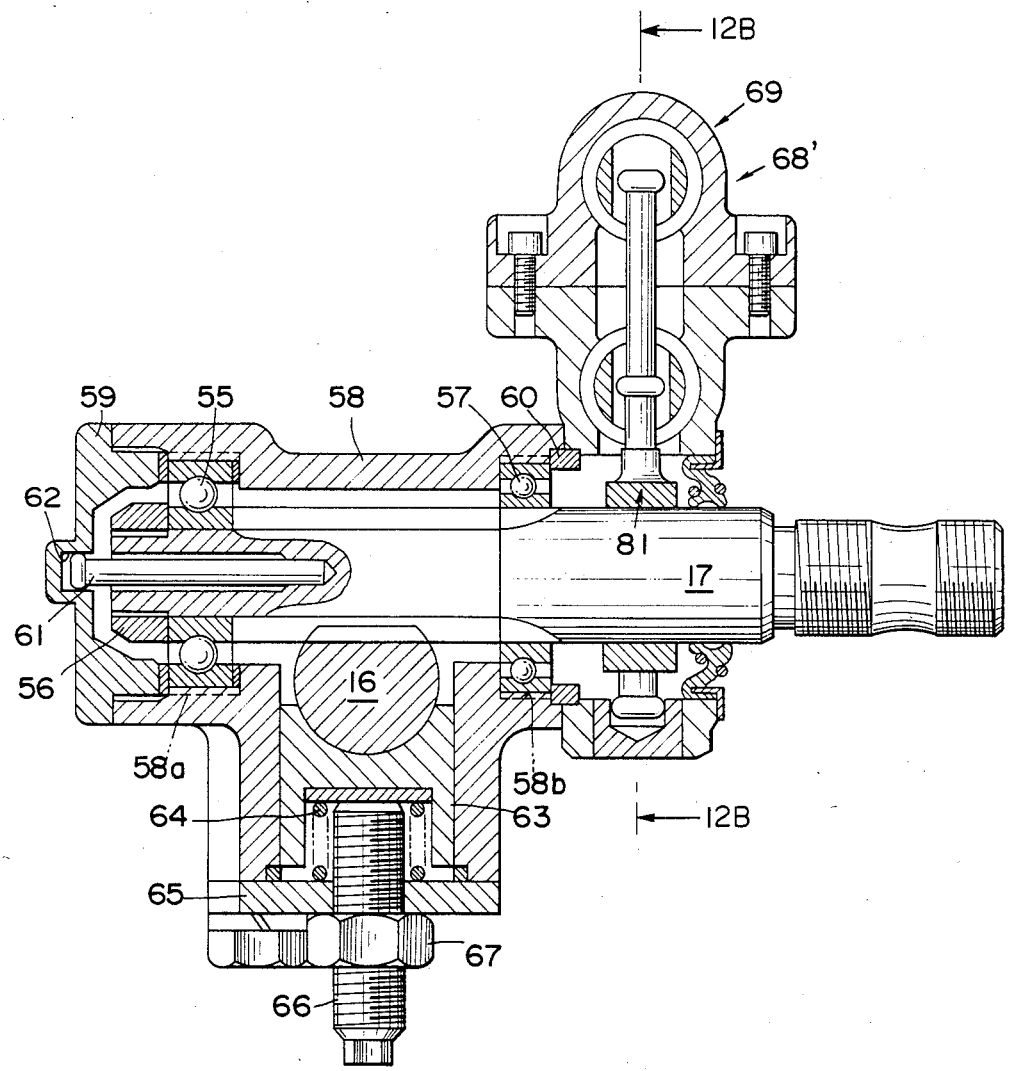
FIG. 12A is a vertical sectional view of a modified example of the control valve assembly of FIGS. 10 and 11.
Figure 12B:
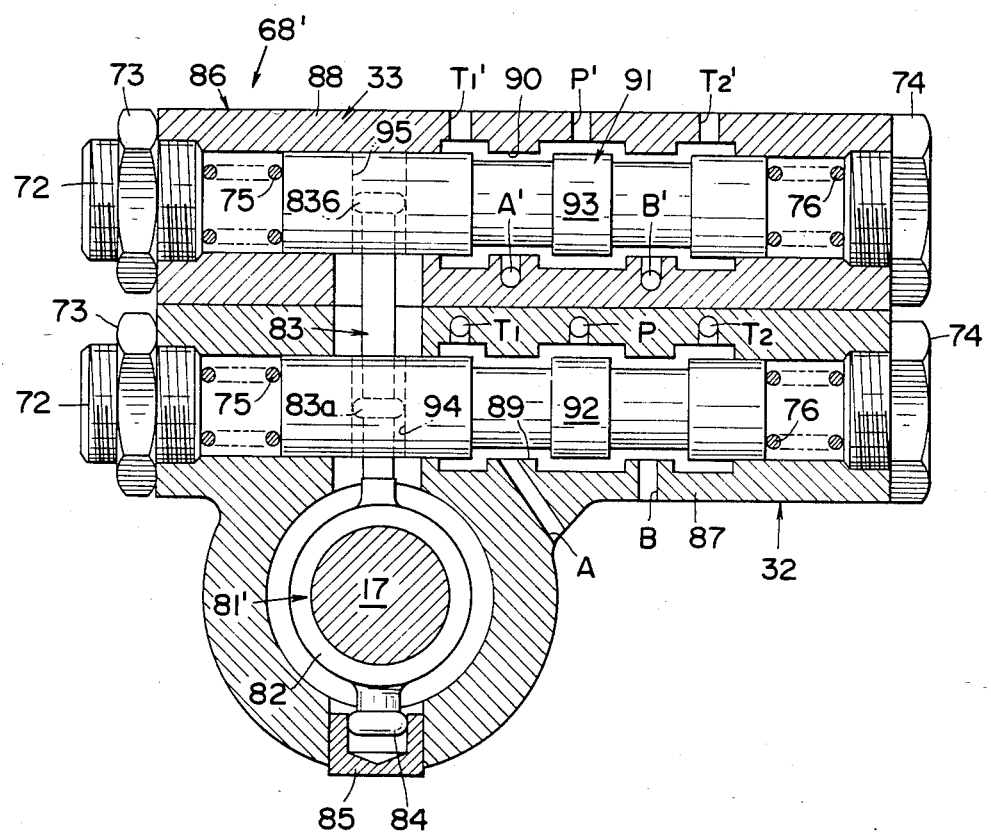
FIG. 12B is a vertical sectional view taken in the direction of arrows substantially along the line 12B—12B of FIG. 12A.

FIGS. 12A and 12B illustrate a modified example of the control valve assembly 68 to be used in the second embodiment vehicle control system of FIG. 9. The control valve assembly 68' of this example includes a spool housing 65 fixed to the gear housing 58 which spool housing 65 has first and second housing sections 87, 88 which are arranged parallel and located in contact with each other. The first housing section 87 is located below the second housing section 88. The first and second housing sections 87 and 88 are respectively formed with first and second piercing openings 89, 90 each of which extends in the direction of the width of the vehicle body 11. A first valve spool section 92 of a valve spool 91 is slidably disposed in the first piercing opening 89, and a second valve spool section 93 of the valve spool 91 is slidably disposed in the second piercing opening 90, so that the first and second valve spool sections 92, 93 are separate from each other and arranged parallel with each other. The first housing section 87 and the first valve spool section 92 constitute the first control valve 32, while the second housing section 88 and the second valve spool section 93 constitute the second control valve 33.

The drive lever 81' is adapted to drivingly connect the pinion gear 17 with the first and second valve spool sections 92, 93. The pinion gear 17 is movably disposed within the first housing section 87. The drive lever 81' is provided with a drive pin 83 including a first drive pin section 83a integrally connected at its lower end with the ring section 82, and a second drive pin section 83b integrally connected at its lower end with the upper end of the first pin section 83a. The first drive pin section 83a movably fits in a hole 94 formed in the first valve spool section 92, while the second drive pin section 83b movably fits in a hole 95 formed in the second valve spool section 93.

With this control valve assembly, the second drive pin section 83b is further from the pinion gear 17 than the first drive pin section 83a. Consequently, the second valve spool section 93 can sensitively respond to the slight displacement of the pinion gear 17 in the direction of the vehicle body width. As a result, the operation of the rear wheel control mechanism 41 can be made more sensitively than in the control valve assembly of FIGS. 10 and 11, substantially without the non-sensitive region S.

Figure 13:
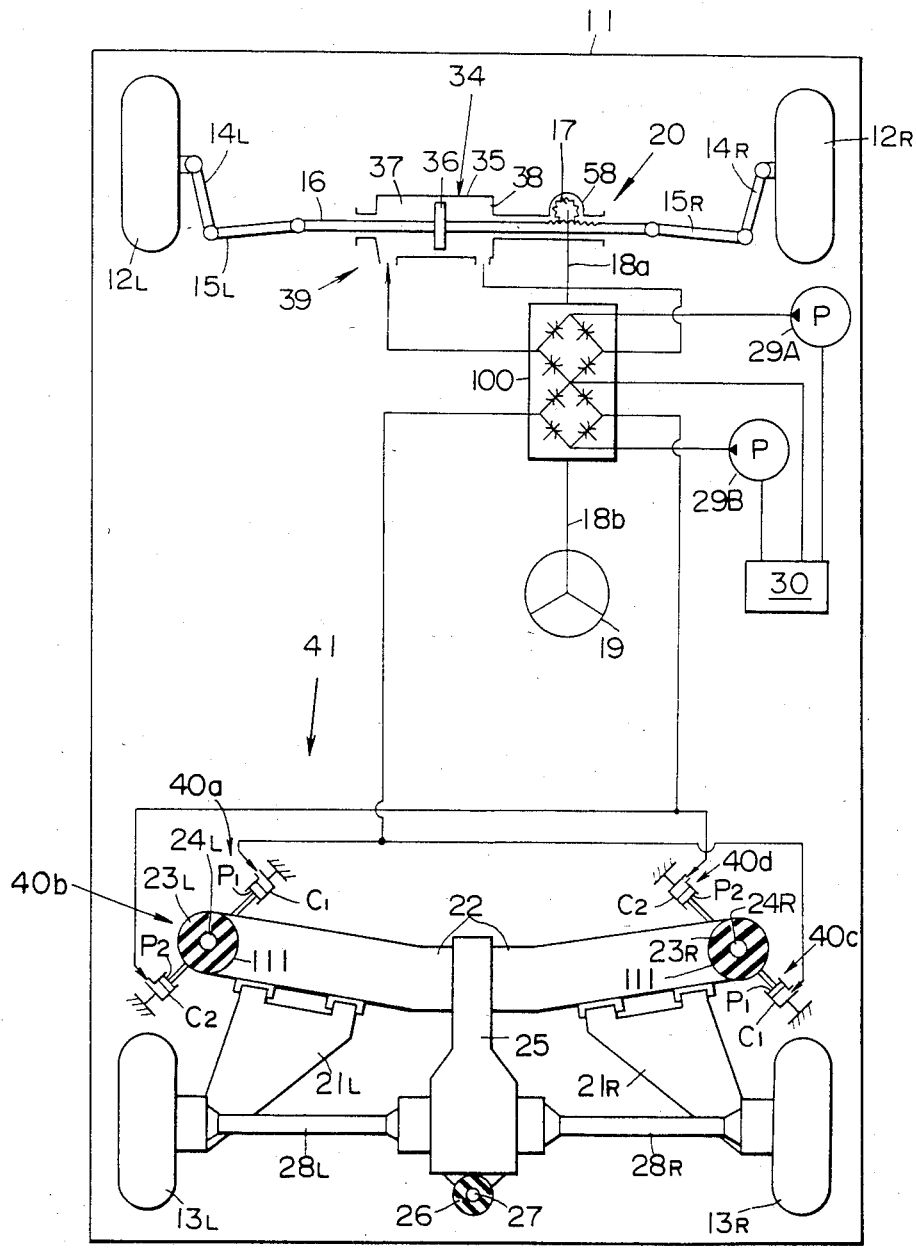
FIG. 13 is a schematic plan view of a third embodiment of the vehicle control system according to the present invention.
Figure 14:
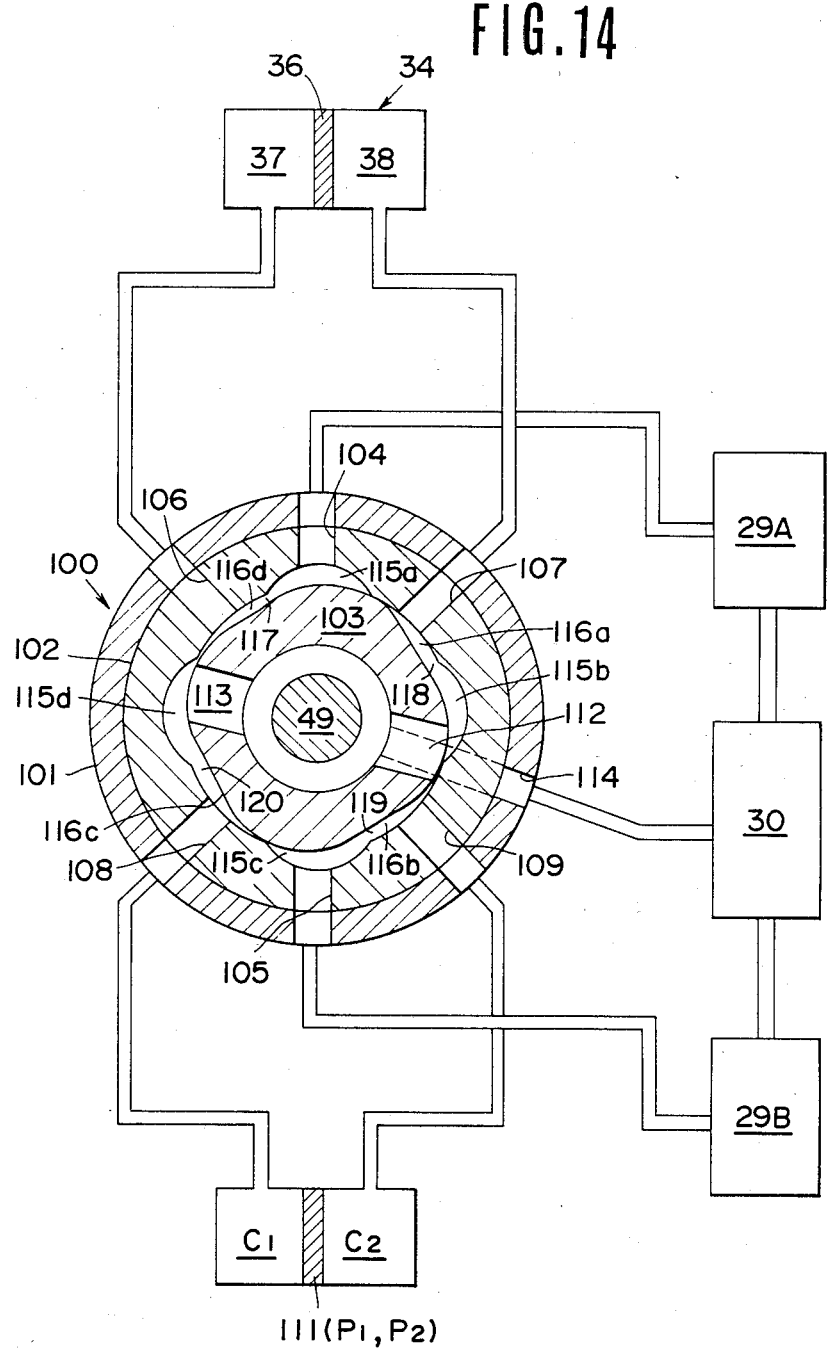
FIG. 14 is a transverse sectional view of the control valve assembly used in the vehicle control system of FIG. 13.

FIGS. 13 and 14 illustrate a third embodiment of the vehicle control system according to the present invention, which is similar to but different in configuration of the control valve assembly from the first embodiment of FIGS. 1 and 6 to 8.

In this embodiment, a pinion shaft 18a for supporting the pinion gear 17 is connected through the torsion bar 49 to a column shaft 18b to which the steering wheel 19 is supported. As shown in FIG. 14, the control valve assembly 100 of this embodiment is a rotary valve type and includes a valve housing 101 in which a hollow cylindrical valve body 102 is rotatably and fittingly disposed. Additionally, a hollow cylindrical valve shaft 103 is rotatably and fittingly disposed in the valve body 102. It is to be noted that the valve body 102 is fixedly connected to the torsion bar 49 at the pinion shaft (18a) side, while the valve shaft 103 is fixedly connected to the torsion bar 49 at the column shaft (18b) side, in which a relative rotation is made between the valve body 102 and the valve shaft 103 when the torsion bar 49 is distorted upon rotation of the steering wheel 19.

The valve body 102 is formed with a first in-port 104 and a second in-port 105 which is located on the opposite side from the first in-port 104 relative to the center axis (not shown) of the valve body 102. The first in-port 104 is fluidly communicated through a line (no numeral) with the first hydraulic pump 29A. The second in-port 104 is fluidly communicated through a line (no numeral) with the second hydraulic pump 29B. The first and second pumps 29A, 29B are fluidly connected to the single reservoir 30 and adapted to pressurize hydraulic fluid from the reservoir to supply it under pressure. The valve body 102 is formed with ports 106, 107 which are respectively fluidly communicated with the fluid chambers 37, 38 of the power cylinder 34. The fluid chambers 37, 38 are divided by the piston 36 which is slidably disposed in the power cylinder 34 in a manner to be movable in axial direction of the power cylinder 34. The piston 36 is fixed to a part of the rack 16 so that the piston 36 and the rack 16 always move as a single member.

The valve body 102 is formed with ports 108, 109 which are fluidly communicated through lines (no numerals) with the first actuator cylinders $C_1$ and the second actuator cylinders $C_2$, respectively, as shown in FIG. 13. A first actuator piston $P_1$ is fittingly disposed in each first actuator cylinder $C_1$ to be slidably movable in the axial direction of the cylinder. Similarly, a second actuator piston $P_2$ is fittingly disposed in each second actuator cylinder $C_2$ to be slidably movable in the axial direction of the cylinder. The first actuator cylinder $C_1$ and the first actuator piston $P_1$ constitute the first actuator 40a, 40c, while the second actuator cylinder $C_2$ and the second actuator piston $P_2$ constitute the second actuator 40b, 40d. Securely disposed between the first actuator piston $P_1$ and the second actuator piston $P_2$ is an insulator housing 111 in which the elastomeric insulator 23L, 23R is securely disposed in such a manner that the insulator is adhered on the inner surface of the insulator housing 111, for example, upon being heated or baked. Thus, the first actuator piston $P_1$, the second actuator piston $P_2$ and the insulator housing 111 are connected integrally with each other to constitute a one-piece actuator assembly. In FIG. 14, the actuator assembly is schematically shown in which the first actuator cylinder $C_1$ is represented as a left chamber, the second actuator cylinder $C_2$ *as a right chamber, and the first actuator piston $P_1$*, insulator housing 111, and second actuator piston $P_2$ in combination as a single piston.

As shown in FIG. 14, the valve shaft 103 is formed with ports 112, 113 which are fluidly communicated with an out-port 114 of the valve housing 101 through a space formed between the valve shaft 103 and the torsion bar 49. The ports 112, 113 are further fluidly communicated with the reservoir 30 via a line (no numeral). The valve body 102 is formed on its inner peripheral surface with four grooves which are located generally at equal intervals in the peripheral direction of the valve body 102, thereby defining first spaces $115a$–$115d$ between the inner peripheral surface of the valve body 102 and the outer peripheral surface of the valve shaft 103. The valve shaft 103 is formed on its outer surface with four flat sections which are located generally at equal intervals in the peripheral direction of the valve shaft 103, thereby defining second spaces 116a–116d between the outer peripheral surface of the valve shaft 103 and the inner peripheral surface of the valve body 102. When the valve shaft 103 is rotated clockwise in FIG. 14, the first and second spaces 115a, 116d, the first and second spaces 115b, 116a, the first and second spaces 115c, 116b, and the first and second spaces 115d, 116c are brought into communication with each other through orifices 117, 118, 119, and 120, respectively, which orifices have become larger in flow passage area. As a result, the flow amount of hydraulic fluid increases between the first in-port 104 and the port 106, between the port 107 and the out-port 114 (through the port 112), between the second in-port 105 and the port 109, and between the port 108 and the out-port 114 (through the port 113).

In operation of the third embodiment vehicle control system of FIGS. 13 and 14, when a driver manually rotates the steering wheel 19 clockwise in FIG. 14 during cornering of the vehicle, the valve shaft 103 also rotates in the same direction in which the hydraulic fluid from the first pump 29A passes the first in-port 104 and enters the inside of the valve body 102 and subsequently passes the orifice 117 formed between the valve body 102 and the valve shaft 103. As a result, the hydraulic fluid is discharged out of the valve body 102 to flow through the line to the fluid chamber 37 of the power cylinder 34. Then, the hydraulic fluid within the fluid chamber 38 of the power cylinder 34 enters the inside of the valve body 102 through the port 107. Subsequently, the hydraulic fluid flows through the orifice 118 into the port 112 of the valve shaft 103, and thereafter is fed to the reservoir 30 through the space between the valve shaft 103 and the torsion bar 49 and through the out-port 114. Thus, a pressure difference is developed between the chambers 37, 38 of the power cylinder 34, thereby compulsorily displacing the piston 36. This provides the steering assisted power to the front wheels 12L, 12R through the rack 16, the side rods 15L, 15R, and knuckle arms 14L, 14R thereby to magnify the driver's steering effort applied to the steering wheel 19. This reduces the driver's steering effort in case no power cylinder is provided.

In addition to the above, the control valve assembly 100 functions as follows: The hydraulic fluid from the second pump 29B passes the second in-port 105, enters the inside of the valve body 102 is subsequently fed through the orifice 119 and the port 109 into the second actuator cylinder $C_2$ of the second actuators 40b, 40d. Then, the hydraulic fluid within the first actuator cylinders $C_1$ of the first actuators 40a, 40d enters the inside of the valve body 102 via the line and the port 108. The thus entered hydraulic fluid flows through the orifice 120 into the port 113 of the valve shaft 103 and thereafter is fed out to the reservoir 30 via the space between the valve shaft 103 and the torsion bar 49 and via the out-port 114. Accordingly, a pressure difference is made between each first actuator cylinder $C_1$ and each second actuator cylinder $C_2$, thereby compulsorily displacing each first actuator piston $P_1$, each second actuator piston $P_2$, and each insulator housing 111. This can eliminate an eccentric elastic deformation of each elastomeric insulator 23L, 23R caused by the compliance steer phenomena of the rear wheels 13L, 13R, thus preventing deterioration of cornering performance of the vehicle due to the compliance steer of the rear wheels 13L, 13R.

The first pump 29A is adapted to decrease the flow of discharged fluid when vehicle speed or engine speed of the vehicle is relatively high, while increasing the flow when the vehicle or engine speed is relatively low as shown in FIG. 2. Accordingly, the front wheels 12L, 12R can be easily turned overcoming a greater resistance between the front wheels and road during vehicle cruising at low speeds, while preventing deterioration in steering performance due to an excessive turning of the front wheels during high speed vehicle cruising. Conversely, the second pump 29B is so adapted that the discharge amount thereof increases when the vehicle or engine speed is relatively high, while decreasing the flow when the vehicle or engine speed is relatively low as shown in FIG. 4. Accordingly, compliance steer due to a smaller side force applied to the rear wheels 13L, 13R is suppressed to a smaller degree during low speed vehicle cruising, while preventing a greater compliance steer required in the rear wheels 13L, 13R due to a greater side force applied to the rear wheels 13L, 13R.

Additionally, the orifice (for example, indicated by the reference numeral 117) through which the hydraulic fluid supplied to the power cylinder 34 passes is adapted to provide no flow passage until the valve shaft 103 rotates over a slight angular range corresponding to the non-sensitive region S shown in FIG. 3, so that no pressure difference is made between the fluid chambers 37, 38 of the power cylinder 34 to develop the steering assist power. Consequently, the driver can obtain an appropriate steering feeling upon feeling resistance to the rotation of the steering wheel 19. The orifice (for example, indicated by the reference 119) through which the hydraulic fluid supplied to the first and second actuator cylinder $C_1$, $C_2$ is operably adapted to allow no non-sensitive region S as shown in FIG. 5, a flow passage is made in the orifice (for example, indicated by the reference numeral 119), even with a slight angular rotation on the steering wheel 19 (except for a "play" region between the pinion gear 17 and the rack 16), and therefore a pressure difference is made between the first actuator cylinder $C_1$ and the second actuator cylinder $C_2$. As a result, the actuators 40a, 40b, 40c, 40d can sensitively respond to the compliance steer of the rear wheels 13L, 13R.

Figure 15:
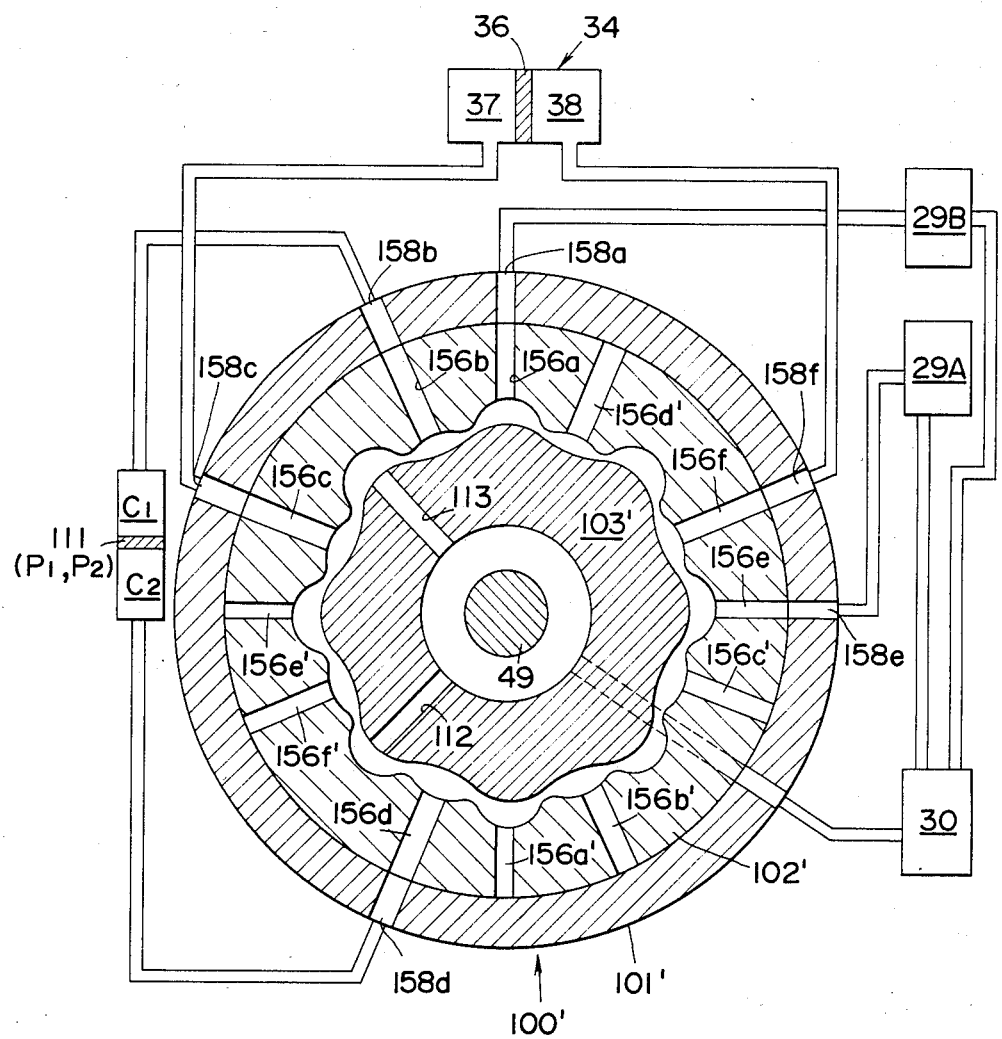
FIG. 15 is a transverse sectional view of a modified example of the control valve assembly of FIG. 14.

FIG. 15 shows a modified example of the control valve assembly of the third embodiment steering system, which is similar to but slightly different from the control valve assembly of FIG. 14 in the structure of the valve housing, the valve body, and the valve shaft. In the control valve assembly 100' of this embodiment, the valve body 102' is formed with radial fluid flow passages or ports 156a–156f which are respectively in communication with ports 158a–158f formed in the valve housing 101'. The ports 158a, 158b, 158c, 158d, 158e and 158f are fluidly communicated with the second pump 29B, the first actuator cylinder $C_1$, the fluid chamber 37 of the power cylinder 34, the second actuator cylinder $C_2$, the first pump 29A, and the fluid chamber 38 of the power cylinder 34, respectively. The valve body 102' is further formed with radial fluid flow passages or ports 156a'–156f' *which are respectively located on the opposite sides of the radial flow passages 156a–156f* relative to the center axis of the valve body 102'. It is to be noted that the radial flow passages 156a'–156f' *are respectively fluidly communicated with those parts 156a–156f* through grooves formed between the outer peripheral surface of the valve body 102' and the inner peripheral surface of the valve housing 101'. The location of the grooves is located differently in the axial direction of the valve body 102', though not shown.

With the thus configurated control valve assembly 100', the fluid flow conditions in the fluid flow passages 156a-156f become the same as in the fluid flow passages 156a'-156f', respectively, so that the symmetrically equivalent forces act on the center axis of the control valve assembly 100', thereby achieving smooth rotation of the valve shaft 103'.

Figure 16:
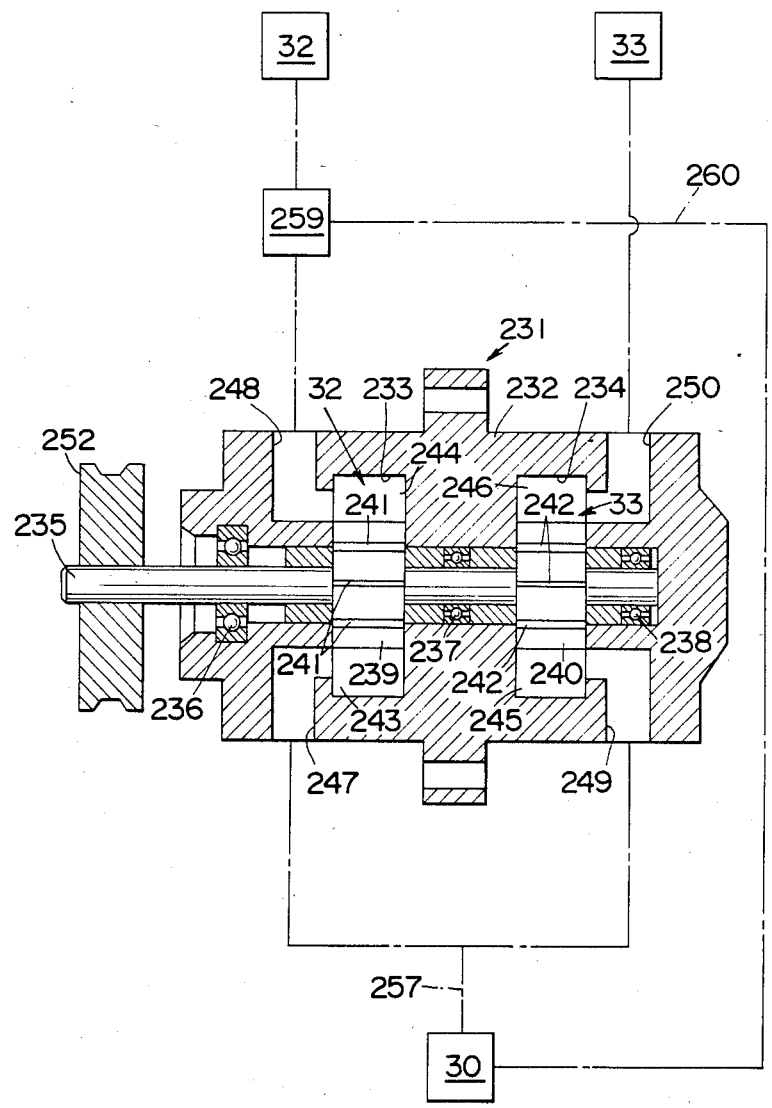
FIG. 16 is an example of a hydraulic pump assembly which may be used in each embodiment of the present invention.

FIG. 16 shows an example of a hydraulic pump assembly 231 as means for providing hydraulic fluid under pressure which pump assembly includes the first and second hydraulic pumps 29A, 29B. The pump assembly 231 includes a pump housing 232 which is formed therein with coaxial first and second pump chambers 233, 234. A drive shaft 235 is rotatably disposed with the pump housing 232 in such a manner that the axis of the drive shaft is not coaxial with that of the first and second pump chambers 233, 234 so that these axes are spaced a predetermined distance from each other. The drive shaft 235 is rotatably supported through bearings 236, 237, 238 within the pump housing 231.

First and second rotors 239, 240 are fixedly mounted on the drive shaft 235 in a manner to be coaxial with the drive shaft. The first and second rotors 239, 240 are rotatably disposed within the first and second pump chambers 233, 234. The first and second rotors 239 and 240 are respectively provided with a plurality of first vanes 241 and a plurality of second vanes 242 in which each vane is radially projectable or withdrawable so that the tip end of each vane is contactable to the inner peripheral surface of the first or second pump chamber 33, 34. Accordingly, the first and second rotors 239, 240 rotate eccentrically a predetermined amount within the first and second pump chambers 233, 234. A space defined by the inner wall of the first pump chamber 233, the first rotor 239, and the adjacent first vanes 241 serves as an expansion chamber 243 or a compression chamber 244. The first expansion and compression chambers 243, 244 are expanded and compressed, respectively, when the first rotor 239 rotates in a right direction or predetermined direction. A space surrounded by the inner wall of the second pump chamber 234, the second rotor 240, and the adjacent second vanes 242, 242 serves as a second expansion chamber 245 or a second compression chamber 246. The second expansion and compression chambers 245, 246 are expanded and compressed, respectively, when the second rotor 240 rotates in the right or predetermined direction.

The pump housing 232 is formed with a first suction port 247, a first discharge port 248, a second suction port 249, and a second discharge port 250, all the ports opening to the outer surface of the pump housing 232. The first suction port 247, the first discharge port 248, the second suction port 249, and the second discharge port 250 are fluidly communicated with the first expansion chamber 243, the first compression chamber 244, the second expansion chamber 245, and the second compression chamber 246, respectively. A drive pulley 252 is fixedly mounted on an end section of the drive shaft 235 which end section is projected out from the pump housing 232. The drive pulley 252 is driven through a belt (not shown) by an engine (not shown).

The first pump chamber 233, the first rotor 239, the first vanes 241 constitute the first hydraulic pump 29A, while the second pump chamber 234, the second rotor 240, the second vanes 242 constitute the second hydraulic pump 29B, in which the first and second hydraulic pumps 29A, 29B are driven by a single power source such as the engine.

The first and second suction ports 247, 249 are fluidly communicated through a suspension pipe 257 with the reservoir 30. The first discharge port 248 is fluidly communicated with the inlet port of the first control valve 32 through a flow control valve 259. The second discharge port 250 is fluidly communicated with the inlet port of the second control valve 33. The flow control valve 259 is adapted to so control the fluid supplied from the first pump 29A as to feed the first control valve 32 with the fluid in a manner as shown in FIG. 17 in which the fluid flow amount supplied to the first control valve 32 is larger at low vehicle or engine speeds while it is smaller at low vehicle or engine speeds. The fluid over a controlled predetermined amount is fed back through a drain pipe 260 to the reservoir 30. The second pump 255 is adapted to supply the second control valve 33 with fluid in a manner as shown in FIG. 18 in which the discharge amount of the second control valve 33 is smaller at low vehicle or engine speeds while it is larger at high vehicle or engine speeds. It will be understood that the characteristics of FIG. 18 may be obtained upon driving the second pump 29 by a propeller shaft (not shown) through which engine power is transmitted to drive wheels.

Thus, the hydraulic pump assembly of FIG. 16 is so configurated that the first and second pumps 32 and 33 are enclosed in the single pump housing, and therefore a required space for pump installation is small as compared with a case two independent pumps are used. As a result, the vehicle control system becomes simple in configuration and small-sized. Furthermore, a required time for pump installation is shortened in production process as compared with the case two independent pumps are used. Moreover, the pump housing 232, the drive shaft 235, the drive pulley 252 and the like commonly used, thereby contributing to production cost reduction.

As appreciated from the above discussion, according to the various embodiments of the vehicle control system according to the present invention, the power steering control system and the compliance steer control system are independently operated by virtue of the first and second control valves 32, 33 which respectively control hydraulic fluid to be fed to the power steering system and the compliance steering control system. Consequently, the power steering system can effectively and appropriately function while allowing the compliance steer control system to function effectively and appropriately thereby so as to attain vehicle cruising stability particularly during cornering at high speeds. Furthermore, an appropriate steering reaction feeling can be obtained even during high speed straight ahead vehicle cruising while effecting compliance steer control or antibody roll control even during steering wheel rotation of a slight angle.

In addition, the first and second control valves 32, 33 are configurated integral with each other as a single control valve assembly and therefore advantageous from view points of weight, production cost, and required space reductions. This advantage is further promoted by forming the valve housing of the control valve assembly integral with the steering gear housing.

While the actuators 40a, 40b, 40c and 40d have been shown and described as being used in the compliance steer control system, it will be appreciated that use of the actuators is not limited to such a system and therefore the actuators may be used in an anti-body roll system for preventing body roll due to centrifugal force during cornering and in any other systems for controlling vehicle operation under the action of hydraulic fluid.

What is claimed is:

1. A vehicle control system comprising:
    a steering gear through which steering effort applied to a steering wheel is transmitted to steerable front wheels so as to turn the front wheels;
    means for providing hydraulic fluid under pressure;
    a control valve assembly including first and second control valves which are different in flow control characteristics from each other, said first and second control valves having first and second valve elements, respectively, which are drivingly connected with each other and movable in synchronism with each other in response to a vehicle operating parameter so as to control the hydraulic fluid from said hydraulic fluid providing means;
    a power cylinder associated with said steering gear and fluidly connected to said first control valve so as to develop steering assist power for turning the front wheels; and
    an actuator drivingly connected to a driven member for controlling a vehicle operation and fluidly connected to said second control valve so as to drive said driven member in response to the hydraulic fluid supplied to said actuator.

2. A vehicle control system as claimed in claim 1, wherein said hydraulic fluid providing means includes first and second hydraulic pumps fluidly connected with said first and second control valves, respectively, said first and second hydraulic pumps being different in characteristics from each other.

3. A vehicle control system as claimed in claim 2, wherein said power cylinder forms part of a power steering system, and said actuator forms part of a rear wheel control mechanism.

4. A vehicle control system as claimed in claim 3, wherein said rear wheel control mechanism is a compliance steer control system.

5. A vehicle control system as claimed in claim 4, wherein said first hydraulic pump is so arranged that discharge amount thereof is larger at low vehicle speeds than in high vehicle speeds.

6. A vehicle control system as claimed in claim 5, wherein said second hydraulic pump is so arranged that discharge amount thereof is larger at high vehicle speeds than at low vehicle speeds.

7. A vehicle control system as claimed in claim 6, wherein said first control valve is adapted to have a non-sensitive region wherein said power steering system is disabled when a slight steering effort is applied to the steering wheel.

8. A vehicle control system as claimed in claim 1, wherein said first and second valve elements are integral with each other in a manner that their axes are aligned with each other.

9. A vehicle control system as claimed in claim 1, wherein said vehicle operating parameter is resistance between the front wheels and road during rotation of the steering wheel.

10. A vehicle control system as claimed in claim 1, further comprising means for displacing said first and second valve elements in response to resistance between the front wheels and road during rotation of the steering wheel.

11. A vehicle control system as claimed in claim 10, wherein said control valve assembly includes:
    a valve housing;
    a hollow cylindrical valve body rotatably disposed in said valve housing and connected with a pinion gear of said steering gear, said valve body having a first port fluidly communicated with said hydraulic fluid providing means, a second port fluidly communicated with said power cylinder, a third port fluidly communicated with said hydraulic fluid providing means, and a fourth port fluidly communicated with said actuator;
    a hollow cylindrical valve member rotatably disposed within said valve body and forming said first and second valve elements;
    means defining first and second variable orifices between said valve body and said valve member, flow passage area of said first and second variable orifices being variable in response to rotational displacement of said valve member relative to said valve body, said first variable orifice controlling fluid communication between said first and second ports, said second variable orifice controlling fluid communication between said third and fourth ports; and
    a valve shaft rotatable with the steering wheel and connected to said valve member.

12. A vehicle control system as claimed in claim 11, wherein said displacing means includes a torsion bar disposed in a central opening of said valve member and securely connected at its one end section with said valve shaft and at the other end thereof with a pinion gear of said steering gear.

13. A vehicle control system as claimed in claim 12, wherein an axis of said torsion bar is aligned with that of said valve shaft and said pinion gear.

14. A vehicle control system as claimed in claim 11, wherein said first and third ports of said valve body are located spaced from each other in axial direction of said valve body, and said second and fourth ports are located spaced from each other in axial direction of said valve body.

15. A vehicle control system as claimed in claim 11, wherein said first and third ports of said valve body are located at the same level in axial direction of said valve body, and said second and fourth ports are located at the same level in axial direction of said valve body.

16. A vehicle control system as claimed in claim 15, wherein said first, second, third and fourth ports of said valve body are located at the same level in axial direction of said valve body.

17. A vehicle control system as claimed in claim 16, wherein said valve body is formed with a fifth port fluidly communicated with said first port, a sixth port fluidly communicated with said second port, a seventh port fluidly communicated with said third port, and an eight port fluidly communicated with said fourth port, said fifth, sixth, seventh and eighth ports being respectively located symmetrical with said first, second, third, and fourth ports with respect to the axis of said valve body.

18. A vehicle control system as claimed in claim 17, wherein said fifth, sixth, seventh, and eighth ports are located at the same level in the axial direction of said valve body.

19. A vehicle control system as claimed in claim 10, wherein said control valve assembly includes:
   a spool housing formed with a first port fluidly communicated with said hydraulic fluid providing means, a second port fluidly communicated with said power cylinder, a third port fluidly communicated with said hydraulic fluid providing means, and a fourth port fluidly communicated with said actuator;
   an elongate valve spool movably disposed within said spool housing and forming said first and second valve elements; and
   means defining first and second variable orifices between said spool housing and said valve spool, flow passage area of said first and second variable orifices being variable in response to axial displacement of said valve spool, said first variable orifice controlling fluid communication between said first and second ports, said second variable orifice controlling fluid communication between said third and fourth ports.

20. A vehicle control system as claimed in claim 19, wherein said displacing means includes:
   a drive lever drivingly connecting a pinion gear of said steering gear and said valve spool in a manner to transmit displacement of said pinion gear in direction of an axis of said valve spool to said valve spool; and
   means for allowing said pinion gear to be displaced in the valve spool axis direction in response to the resistance between the front wheels and the road.

21. A vehicle control system as claimed in claim 20, wherein said allowing means includes:
   means defining first and second openings at opposite end sections of a pinion gear housing in which said pinion gear is movably disposed, each opening having an elliptical cross-section whose longitudinal axis is parallel with the valve spool axis; and
   first and second bearings by which first and second end sections of said pinion gear are rotatably supported, respectively, said first and second bearings being respectively disposed in said first and second openings and movable in direction of the longitudinal axis of each opening; and
   a reaction spring for biasing said pinion gear to keep said valve spool in its neutral position.

22. A vehicle control system as claimed in claim 10, wherein said control valve assembly includes:
   first and second spool housings secured to each other to be in contact with each other, said first spool housing being formed with a first port fluidly communicated with said hydraulic fluid providing means, and a second port fluidly communicated with said power cylinder, said second spool housing being formed with a third port fluidly communicated with said hydraulic fluid providing means, and a fourth port fluidly communicated with said actuator;
   first and second valve spools slidably disposed in said first and second spool housings, respectively, and located parallel with each other, said first and second valve spools forming said first and second valve elements, respectively;
   means defining a first variable orifice between said first spool housing and said first valve spool, flow passage area of said first variable orifice being variable in response to axial displacement of said first valve spool; and
   means defining a second variable orifice between said second spool housing and said second valve spool, flow passage area of said second variable orifice being variable in response to axial displacement of said second valve spool.

23. A vehicle control system as claimed in claim 22, wherein said displacing means includes:
   a drive lever drivingly connecting a pinion gear of said steering gear with said first and second valve spools in a manner to transmit displacement of said pinion gear in direction of axis of each valve spool to said first and second valve spools; and
   means for allowing said pinion gear to be displaced in the valve spool axis direction in response to the resistance between the front wheels and the road.

24. A vehicle control system as claimed in claim 23, wherein said drive lever includes a first drive pin section drivingly engaged with said first valve spool, and a second drive pin section drivingly engaged with said second valve spool and integral and aligned with said first drive pin section, said second drive pin section being farther from said pinion gear than said first drive pinion section.

* * * * *